(12) United States Patent  
Geisler et al.

(10) Patent No.: US 8,931,768 B2  
(45) Date of Patent: Jan. 13, 2015

(54) MOUNT ASSEMBLY FOR SUSPENSION DAMPER

(75) Inventors: Robert L. Geisler, Grand Blanc, MI (US); Ravindra P. Patil, Troy, MI (US); Joseph A. Schudt, Macomb, MI (US); Daryl R. Poirier, Davisburg, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 130 days.

(21) Appl. No.: 13/494,168

(22) Filed: Jun. 12, 2012

(65) Prior Publication Data

US 2013/0328255 A1 Dec. 12, 2013

(51) Int. Cl.  
*B60G 21/00* (2006.01)

(52) U.S. Cl.  
USPC ...................................... 267/220; 267/140.3

(58) Field of Classification Search  
USPC .............. 267/220, 140.3, 219, 153, 154, 292, 267/293, 136  
See application file for complete search history.

(56) References Cited

U.S. PATENT DOCUMENTS

| 5,257,730 A * | 11/1993 | Nakaura ........................ 267/220 |
| 6,296,237 B1 * | 10/2001 | Nagai ............................ 267/220 |
| 2002/0109328 A1 * | 8/2002 | Remmert et al. ...... 280/124.147 |

* cited by examiner

*Primary Examiner* — Melanie Torres Williams  
(74) *Attorney, Agent, or Firm* — Quinn Law Group, PLLC

(57) ABSTRACT

A mount assembly for a suspension damper is provided which includes a piston rod extending about an axis and a mount housing. A jounce bumper is axially positioned about the piston rod and has an end surface and a radially outer surface. The jounce bumper is formed of a first deformable material selectable for absorbing energy from an axial force applicable through the piston rod. A jounce bumper cup formed of a second deformable material selectable for absorbing additional energy fits onto the end surface of the jounce bumper. The jounce bumper cup has a wall portion extending sufficiently around the radially outer surface of the jounce bumper to retain it in position and a load mount portion extending to the mount housing and being configured to absorb the additional energy.

9 Claims, 4 Drawing Sheets

MOUNT ASSEMBLY FOR SUSPENSION DAMPER

TECHNICAL FIELD

The present invention relates to a vehicle suspension and more particularly to a mount assembly for a suspension damper.

BACKGROUND

Use of larger (such as eighteen or nineteen inch instead of seventeen inch) diameter, low profile tires generates higher forces to be absorbed by suspension dampers during impact events such as hitting bumps or potholes. Current devices to absorb these forces include modifying shock damping, reducing tire sizes and changing spring rates. However, changes to these devices may impact other vehicle imperatives such as ride, handling, packaging or styling. They may also increase vehicle mass and potentially vehicle cost. There is a need to provide suspension dampers which can be part of the vehicle suspension strut or shock absorber assembly and may be mounted on either the front or the rear of the vehicle and which can absorb these forces without the above listed concerns.

SUMMARY

A mount assembly for a suspension damper is provided. The mount assembly includes a piston rod extending about an axis and having a first end and a second end. An axial force is applicable to the second end of the piston rod. A mount housing is axially positioned about the first end of the piston rod. A jounce bumper is also axially positioned about the piston rod. The jounce bumper has an end surface and a radially outer surface. The jounce bumper is formed of a first deformable material selectable for absorbing energy from an axial force applicable through the piston rod. A jounce bumper cup formed of a second deformable material selectable for absorbing additional energy from such axial force fits onto the end surface of the jounce bumper. The jounce bumper cup has a wall portion extending sufficiently around the radially outer surface of the jounce bumper to retain the jounce bumper in position. The jounce bumper cup also has a load mount portion extending to the mount housing which is configured to absorb the additional energy when such axial force is applicable.

The mount assembly may be used in a suspension damper portion of a suspension shock absorber assembly.

The mount assembly may further be used in a vehicle. For example, the mount assembly may be in a suspension damper portion of a suspension shock absorber assembly or strut module generally connecting a vehicle body member and a vehicle axle/wheel support member.

The above features and advantages, and other features and advantages, of the present invention are readily apparent from the following detailed description of some of the best modes and other embodiments for carrying out the invention, as defined in the appended claims, when taken in connection with the accompanying drawings.

BRIEF DESCRIPTION OF THE DRAWINGS

(In FIGS. 3A-3D, only a mount housing member, the jounce bumper cup of the present invention and a portion of the piston rod are shown for clarity.)

DETAILED DESCRIPTION

Figure 1:
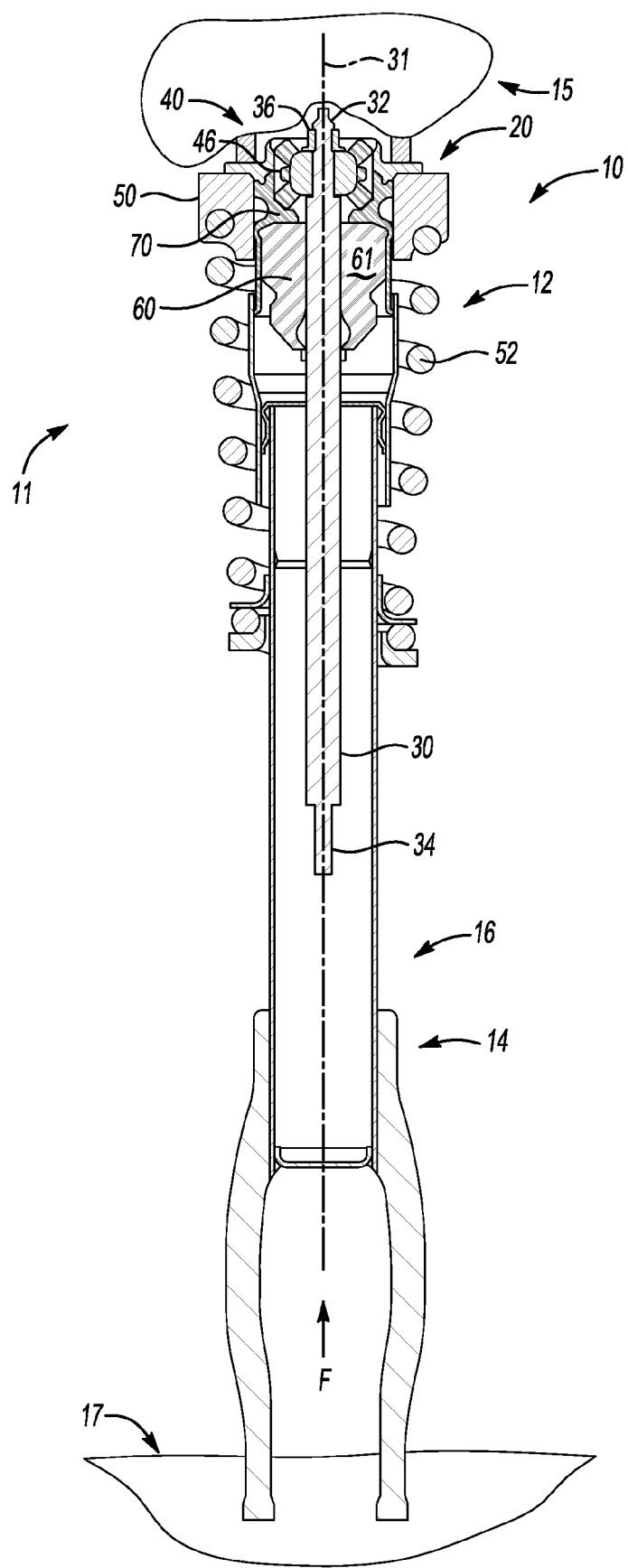
FIG. 1 is a schematic illustration of a suspension shock absorber assembly mounted in a vehicle shown in partial cross-sectional view and including the mount assembly of the present invention.

Referring to FIG. 1, a mount assembly 20 for a suspension damper 12 is generally shown. Suspension damper 12 is shown as part of a suspension shock absorber assembly 10 but could be included in a strut module if desired. The mount assembly 20 of the suspension shock absorber assembly 10 may be attached to a mounting tower formed in a wheel well or other vehicle body member 15 of the vehicle 11. A damper cartridge 16 including supports 14 at an end of the suspension shock absorber assembly 10 may be attached to a steerable wheel assembly or other vehicle axle/wheel support member 17, by any suitable manner, of the vehicle 11. The suspension shock absorber assembly 10 includes conventional suspension damper parts (not all of which are shown) such as a reservoir tube, valved piston, seals, etc. which form the damper cartridge 16 and which are known to one skilled in the art, requiring no further description.

Figure 2:
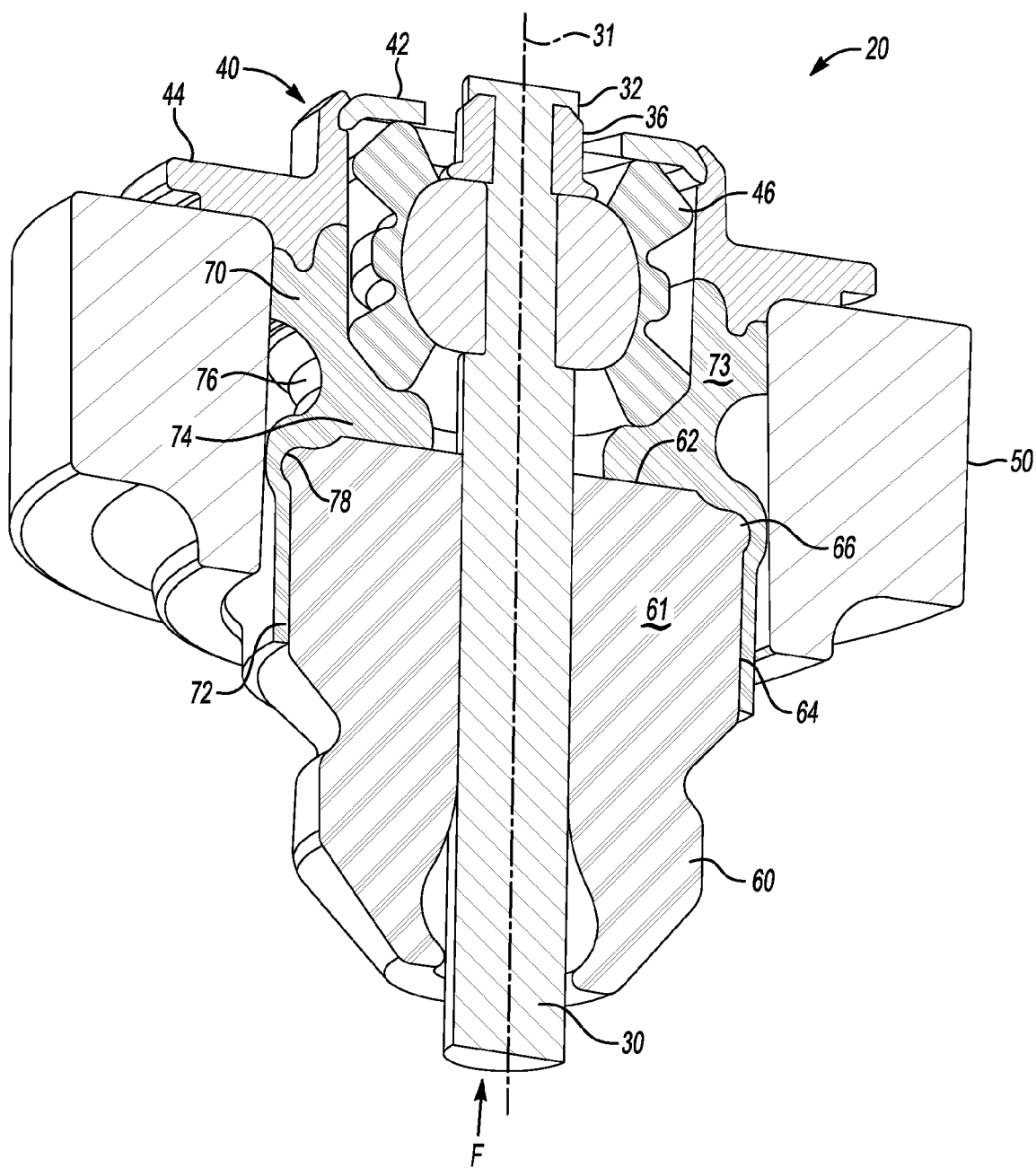
FIG. 2 is a schematic cross-sectional perspective view of the mount assembly of the present invention.

Referring to FIGS. 1 and 2, the mount assembly 20 includes a piston rod 30 extending about an axis 31 and having a first end 32 and a second end 34. An axial force F is applicable to the piston rod 30. The first end 32 of the piston rod 30 includes a fastener 36. A mount housing 40 is axially positioned about the first end 32 of the piston rod 30. The mount housing 40 includes a mount housing cap 42 and a mount housing member 44. Both the mount housing cap 42 and the mount housing member 44 may be formed of steel or other sufficiently strong material to provide structure without unnecessary weight. A mount bushing 46 is also axially located about the first end 32 of the piston rod 30 within the mount housing 40. The mount bushing 46 is formed of a rubber-type material, which allows the piston rod 30 to adjust to the vehicle 11 body movement without binding. The suspension shock absorber assembly 10 includes a coil spring housing 50 which is axially positioned about the piston rod 30 and fits under and adjacent to the mount housing 40. The coil spring housing 50 may provide a seat for the coil spring 52 and bearing assembly of a common shock absorber assembly. Accordingly, coil spring housing 50 is formed of steel or other sufficiently strong and durable material.

Also shown in FIGS. 1 and 2 is a jounce bumper 60 which is axially positioned about the piston rod 30. The jounce bumper 60 has a conventional shape which is wider at its end surface 62 and then tapers toward the piston rod 30 near the lower end of the jounce bumper 60. The jounce bumper 60 also has a radially outer surface 64 and is formed of a first deformable material 61 which deforms upon absorbing energy from an axial force F applicable through the piston rod 30. This type of material is selectable to deform to a certain level and then transmit further energy to the vehicle body member 15. The radially outer surface 64 of the jounce bumper 60 also includes an axial bump 66 for retaining the jounce bumper 60 in position as discussed in more detail below.

Also shown in FIGS. 1 and 2 is a jounce bumper cup 70. The jounce bumper cup 70 is operatively positioned on the radially outer surface 64 and the end surface 62 of the jounce bumper 60. The jounce bumper cup 70 has a wall portion 72 extending around the radially outer surface 64 and the end surface 62 of the jounce bumper 60 to retain the jounce bumper 60 in position as the piston rod 30 moves up and down with the movement of the vehicle 11. The jounce bumper cup 70 has a load mount portion 74 which extends to the mount housing 40. The jounce bumper cup 70 includes an indent or notch 78 for engaging the jounce bumper axial bump 66 to retain the jounce bumper 60 within the jounce bumper cup 70.

The jounce bumper cup 70 is formed of a second deformable material 73, selectable for absorbing additional energy from an axial force F applicable through the piston rod 30, such as a thermoplastic urethane or thermoplastic polyester elastomer. This second deformable material 73 may provide the flexibility of rubber, the strength of plastic and the processibility of thermoplastic. One type of suitable second deformable material 73 is Dupont HYTREL® but other types having similar properties are available from BASF and other manufacturers. This second deformable material 73 such as the thermoplastic urethane material is able to be deformed and then to regain its previous shape without permanent deformation such as occurs with the jounce bumper 60 first deformable material 61 if it is deformed too far.

As shown in FIG. 2, the load mount portion 74 of the jounce bumper cup 70 is shaped or configured to absorb additional energy from the force F applicable through the piston rod 30. The load mount portion 74 of the jounce bumper cup 70 extends to the mount housing 40, providing sufficient second deformable material 73 which is shaped or configured to absorb the additional energy when such axial force is applicable. The axial direction of the applicable force F causes the load mount portion 74 of the jounce bumper cup 70 to deform and deflect between the jounce bumper 60 and the mount housing 40. Any deformation against the mount bushing 46 or the coil spring housing 50 is incidental and does not appreciably affect the performance of the mount assembly 20 of the present invention. As shown in FIGS. 3A-3D, the shape or configuration of the load mount portion 74 of the jounce bumper cup 70 includes an elliptical deflecting groove 76 having a height or axial dimension (d1, d2, d3 or d4 respectively) which decreases as the force increases.

Figure 3A:
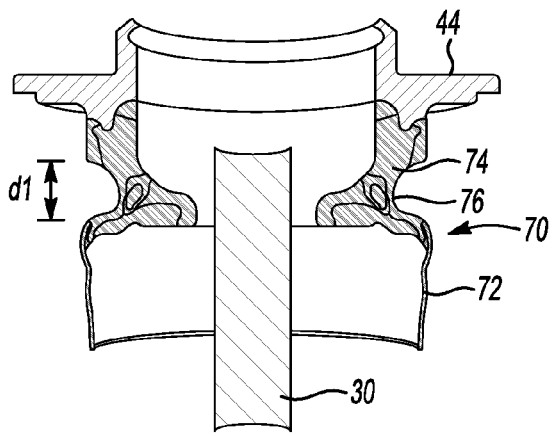
FIGS. 3A-3D are schematic cross-sectional partial views showing the deformation of the jounce bumper cup of the present invention including the deflection of an elliptical deflecting groove as an axial force is applied through the piston rod.
Figure 3B:
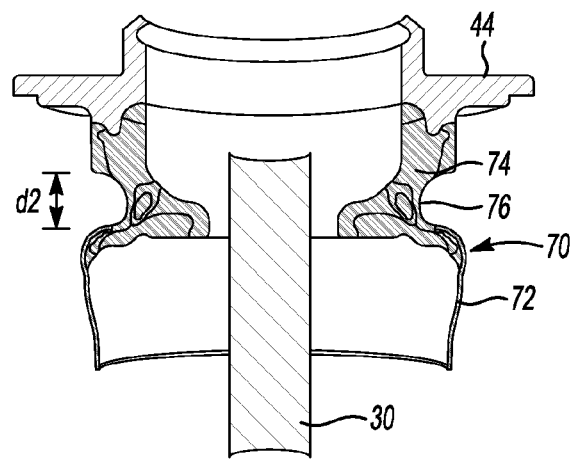
Figure 3C:
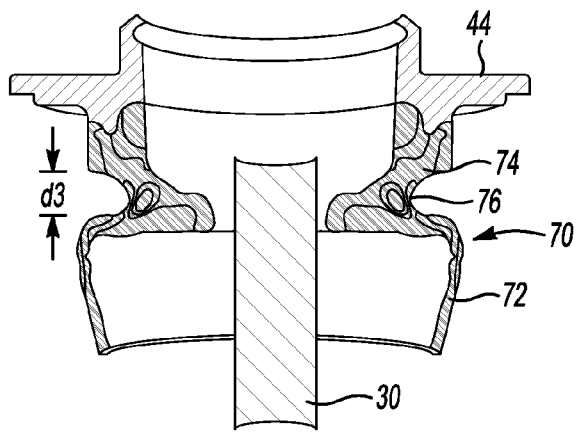
Figure 3D:
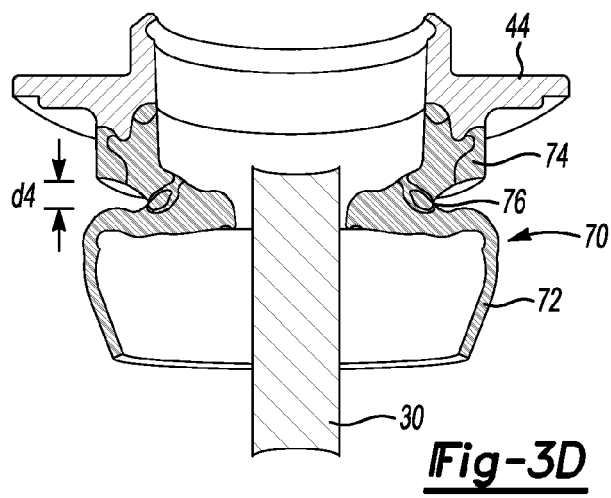

Referring to FIGS. 3A-3D, the mount assembly is shown in each view with only the mount housing member 44, the jounce bumper cup 70 having a wall portion 72 and a load mount portion 74 and a portion of the piston rod 30 to show an illustration of the computer modeling of the deflection of the elliptical deflecting groove 76 and the jounce bumper cup 70 as an axial force F is applied through the piston rod 30. The jounce bumper 60 was removed in FIGS. 3A-3D to clearly show the deformation of the wall portion 72 and the load mount portion 74 of the jounce bumper cup 70 of the present invention although one skilled in the art will recognize that the jounce bumper 60 absorbs some of the force transmitted through the piston rod 30. FIG. 3A shows deformation including the axial dimension d1 of the elliptical deflecting groove 76 of the jounce bumper cup 70 when 25% of the maximum compression force is applied through the piston rod 30. FIG. 3B shows deformation including the axial dimension d2 of the elliptical deflecting groove 76 of the jounce bumper cup 70 when 50% of the maximum compression force is applied through the piston rod 30. FIG. 3C shows deformation including the axial dimension d3 of the elliptical deflecting groove 76 of the jounce bumper cup 70 when 75% of the maximum compression force is applied through the piston rod 30. FIG. 3D shows deformation including the axial dimension d4 of the elliptical deflecting groove 76 of the jounce bumper cup 70 when 100% of the maximum compression force is applied through the piston rod 30. As the compression force is increased, the axial dimension (d1-d4) of the elliptical deflecting groove 76 decreases. As recognized by those skilled in the art, actual deformation and deflection will vary depending on the second deformable material 73 selected and the specific shape or configuration of the jounce bumper cup 70.

Figure 4A:
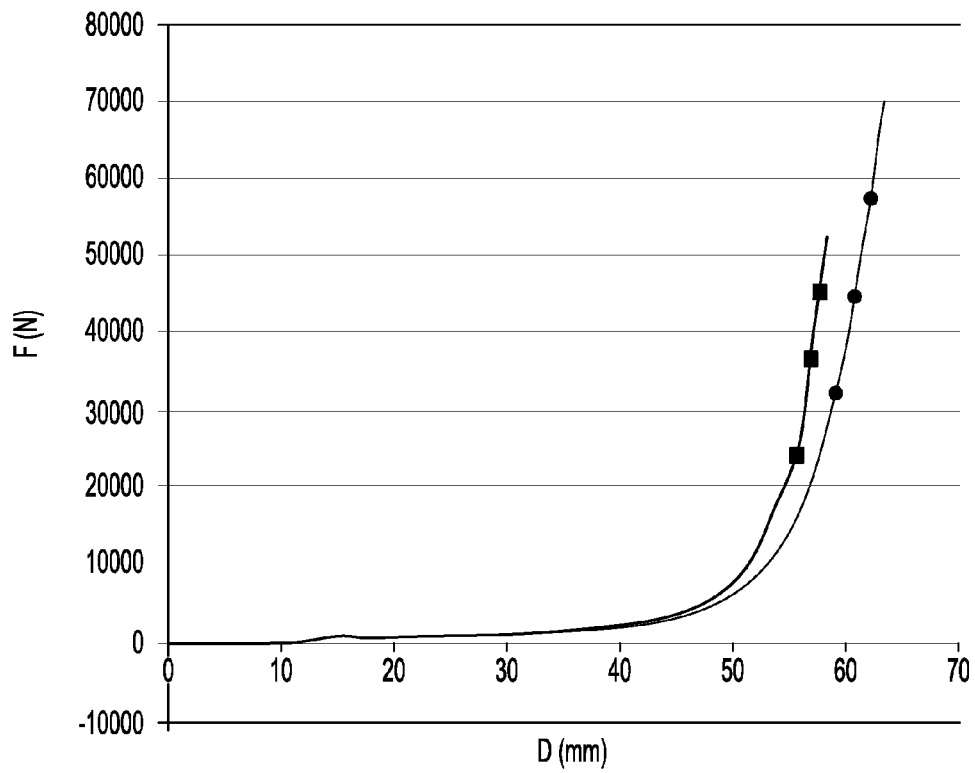
FIG. 4A is a graph of force (newtons) versus displacement (millimeters) showing the additional displacement that is provided (for a certain force) by the jounce bumper and jounce bumper cup having a wall portion and a load mount portion of the present invention (graph line with circles) as compared to having only a standard jounce bumper and jounce bumper cup (graph line with squares).
Figure 4B:
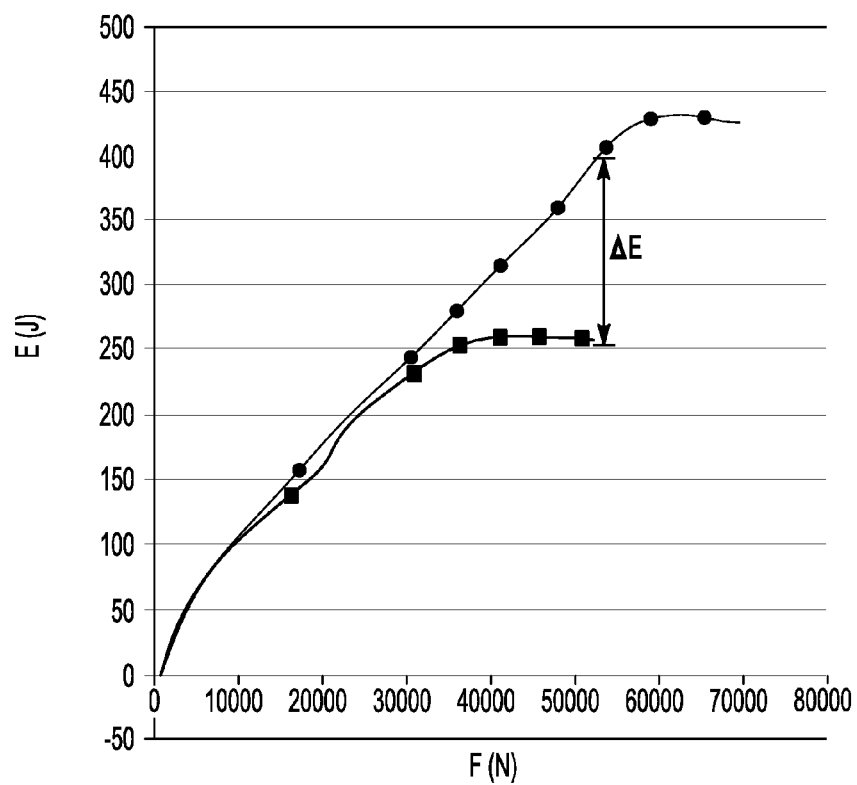
FIG. 4B is a graph of energy (joules) versus force (newtons) showing the additional energy which is absorbed by the jounce bumper and jounce bumper cup having a wall portion and a load mount portion of the present invention (graph line with circles) as compared to having only a standard jounce bumper and jounce bumper cup (graph line with squares).

Referring to both FIGS. 4A and 4B, the lines in each graph with squares on the line represent using a conventional jounce bumper 60 (and conventional jounce bumper cup) and the lines in each graph with circles on the line represent using the jounce bumper cup 70 of the present invention along with a conventional jounce bumper 60. In FIG. 4A, the graph of force (newtons) versus displacement (millimeters) shows the increase in the displacement of the piston rod 30 for an applied force when the jounce bumper cup 70 of the present invention is used. In FIG. 4B, the graph of energy (joules) versus force (newtons) shows the additional energy that is absorbed and thus not transferred into the vehicle body member 15 when the jounce bumper cup 70 having the wall portion 72 and the load mount portion 74 according to the present invention is used. Above the maximum compression force, further energy may be transferred to the vehicle body member 15.

In another aspect of the present invention, the mount housing member 44 of the mount housing 40 may be formed integrally with the jounce bumper cup 70 as long as the mount housing member 44 of the integral part includes a more rigid material such as a coated steel or other metal plate within the second deformable material 73 so that the upper portion of the integral mount housing member and jounce bumper cup is stronger (and thus not deformable at even the increased loads) than the jounce bumper cup portion shown separately in the drawings.

The present invention provides a jounce bumper cup 70 fitting into shock absorber modules or strut modules while providing increased displacement and energy absorption.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A mount assembly for a suspension damper comprising:
   a piston rod extending about an axis and having a first end and a second end to which an axial force is applicable;
   a mount housing axially positioned about the first end of the piston rod;
   a jounce bumper axially positioned about the piston rod and having an end surface and a radially outer surface, the jounce bumper formed of a first deformable material selectable for absorbing energy from the axial force applicable through the piston rod; and a jounce bumper cup formed of a second deformable material selectable for absorbing additional energy from such axial force; the jounce bumper cup fitting onto the end surface of the jounce bumper and having a wall portion extending sufficiently around the radially outer surface of the jounce bumper to retain the jounce bumper in position; the jounce bumper cup having a load mount portion extending to the mount housing and being configured to absorb the additional energy when such axial force is applicable; and wherein the load mount portion includes an elliptical deflecting groove.

2. The mount assembly of claim 1 wherein the axial dimension of the elliptical deflecting groove decreases as the force applicable through the piston rod increases and the second deformable material deforms.

3. The mount assembly of claim 1 wherein the jounce bumper includes an axial bump on the radially outer surface, and the jounce bumper cup includes an indent for engaging the jounce bumper axial bump to retain the jounce bumper within the jounce bumper cup.

4. A suspension shock absorber assembly for a vehicle comprising:
   a mount assembly having:
      a piston rod extending about an axis and having a first end and a second end to which an axial force is applicable;
      a mount housing axially positioned about the first end of the piston rod;
      a jounce bumper axially positioned about the piston rod and having an end surface and a radially outer surface, the jounce bumper formed of a first deformable material selectable for absorbing energy from the axial force applicable through the piston rod;
      a jounce bumper cup formed of a second deformable material selectable for absorbing additional energy from such axial force; the jounce bumper cup fitting onto the end surface of the jounce bumper and having a wall portion extending sufficiently around the radially outer surface of the jounce bumper to retain the jounce bumper in position; the jounce bumper cup having a load mount portion extending to the mount housing and being configured to absorb the additional energy when such axial force is applicable, wherein the load mount portion includes an elliptical deflecting groove;
   a coil spring housing adjacent to the mount assembly; and
   a damper cartridge connected to the mount assembly and through which such axial force applicable to the piston rod is applied.

5. The suspension shock absorber assembly of claim 4 wherein the axial dimension of the elliptical deflecting groove decreases as the force applicable through the piston rod increases and the second deformable material deforms.

6. The suspension shock absorber assembly of claim 4 wherein the jounce bumper includes an axial bump on the radially outer surface, and the jounce bumper cup includes an indent for engaging the jounce bumper axial bump to retain the jounce bumper within the jounce bumper cup.

7. A vehicle comprising:
   a suspension damper including a mount assembly having:
      a piston rod extending about an axis and having a first end and a second end to which an axial force is applicable;
      a mount housing axially positioned about the first end of the piston rod;
      a jounce bumper axially positioned about the piston rod and having an end surface and a radially outer surface, the jounce bumper formed of a first deformable material selectable for absorbing energy from the axial force applicable through the piston rod;
      a jounce bumper cup formed of a second deformable material selectable for absorbing additional energy from such axial force; the jounce bumper cup fitting onto the end surface of the jounce bumper and having a wall portion extending sufficiently around the radially outer surface of the jounce bumper to retain the jounce bumper in position; the jounce bumper cup having a load mount portion extending to the mount housing and being configured to absorb the additional energy when such axial force is applicable, wherein the load mount portion includes an elliptical deflecting groove; and
      a damper cartridge connected to the mount assembly and through which such axial force applicable to the piston rod is applied, wherein the damper cartridge includes supports;
   a vehicle body member connected to the mount assembly; and
   a vehicle axle/wheel support member connected to the supports of the damper cartridge.

8. The vehicle of claim 7 wherein the axial dimension of the elliptical deflecting groove decreases as the force applicable through the piston rod increases and the second deformable material deforms.

9. The vehicle of claim 7 wherein the jounce bumper includes an axial bump on the radially outer surface, and the jounce bumper cup includes an indent for engaging the jounce bumper axial bump to retain the jounce bumper within the jounce bumper cup.

* * * * *